(12) United States Patent
Carter

(10) Patent No.: US 8,449,013 B2
(45) Date of Patent: May 28, 2013

(54) AUTOMOTIVE VEHICLE INSTRUMENT PANEL CONSTRUCTION

(75) Inventor: David W. Carter, Cable, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/094,083

(22) Filed: Apr. 26, 2011

(65) Prior Publication Data

US 2012/0274090 A1  Nov. 1, 2012

(51) Int. Cl.
  *B60J 7/00* (2006.01)
(52) U.S. Cl.
  USPC .................................. 296/70; 296/72; 180/90
(58) Field of Classification Search
  USPC ......................................... 296/70, 72; 180/90
  See application file for complete search history.

(56) References Cited

U.S. PATENT DOCUMENTS

| | | | |
|---|---|---|---|
| 5,685,598 A * | 11/1997 | Inoue et al. | 296/72 |
| 5,938,266 A | 8/1999 | Dauvergne et al. | |
| 6,464,281 B2 | 10/2002 | Volkmann et al. | |
| 6,488,330 B2 * | 12/2002 | Hedderly | 296/192 |
| 6,517,145 B2 | 2/2003 | Hedderly | |
| 7,735,905 B2 * | 6/2010 | Mullen et al. | 296/193.02 |
| 7,823,952 B2 | 11/2010 | Utsugi et al. | |
| 7,909,390 B2 * | 3/2011 | Szoke et al. | 296/193.02 |
| 2010/0084886 A1 | 4/2010 | Utsugi et al. | |

FOREIGN PATENT DOCUMENTS

| | | |
|---|---|---|
| DE | 101 52 242 | 9/2003 |
| EP | 1 657 105 | 5/2006 |
| FR | 2 765 175 | 12/1998 |
| FR | 2 772 682 | 6/1999 |

\* cited by examiner

*Primary Examiner* — Joseph Pape
(74) *Attorney, Agent, or Firm* — Fay Sharpe LLP

(57) ABSTRACT

An automotive vehicle including a passenger compartment and an instrument panel is provided. The instrument panel includes a beam disposed at a forward end of the compartment and extending across the width of the compartment. A driver's side instrument panel module is secured to the beam. A passenger's side instrument panel module is also secured to the beam. A defrost module is located adjacent at least one of the driver's side module and said passenger side module and positioned to provide forced air flow over the windshield of the vehicle. A driver's side vent module is disposed between the driver's side module and the sidewall of the compartment. In addition, a passenger side vent module is disposed between the passenger side module and the opposed compartment sidewall.

10 Claims, 3 Drawing Sheets

AUTOMOTIVE VEHICLE INSTRUMENT PANEL CONSTRUCTION

BACKGROUND

The present exemplary embodiment relates to an instrument panel for an automotive vehicle. It finds particular application in conjunction with an instrument panel having a modular construction, and will be described with particular reference thereto. However, it is to be appreciated that the present exemplary embodiment is also amenable to other like applications.

A conventional instrument panel (used interchangeably throughout this disclosure with the term "dashboard") typically comprises an integral panel located under the windshield of a vehicle. As is known, the instrument panel of a motor vehicle is set in the front part of the passenger compartment and normally extends across the width of the passenger compartment. The instrument panel is usually constructed to perform both aesthetic and functional duties in the passenger compartment.

The instrument panel usually contains instrumentation and controls associated with the operation, functionality, and/or monitoring of the vehicle. For example, an instrument panel can include multiple gauges (such as speedometer, tachometer, odometer, and/or fuel gauge), indicators (such as gear shift position, seat belt warning lights, and/or engine malfunction lights), and other instruments. An instrument panel may also include heating or ventilation controls, lighting controls, audio equipment, and associated controls, navigation systems, storage compartments (e.g., glove compartments), and other features. In modern motor vehicles, the instrument panel also includes compartments housing anti-impact safety devices.

Generally, these instruments, indicators, controls, safety devices and other components are located in fixed positions on a single dashboard panel. For example, the gauges and indicators may be at a driver's side of the dashboard, the audio and ventilation equipment may be centrally located, and a storage compartment may be at a passenger's side of the dashboard. Various wiring harnesses may be provided to link the gauges and controls, etc. with components in the engine compartment or elsewhere in the vehicle.

Known dashboards can present various drawbacks. In the first place, they are complicated to produce, given that a shell made of a single piece receives a complex mould. Furthermore, for each model of motor vehicle it is necessary to produce and store different dashboard configurations if options will exist. In the mass production of a model of motor vehicle and in the distribution of the corresponding spare parts, there is the drawback in having to provide enormous space for the stockage, selection and distribution of the various models of dashboards.

SUMMARY

Various details of the present disclosure are hereinafter summarized to facilitate a basic understanding, where this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter.

According to a first embodiment, an automotive vehicle including a passenger compartment and an instrument panel is provided. The instrument panel includes a beam disposed at a forward end of the compartment and extending across the width of the compartment. A driver's side instrument panel module is secured to the beam. A passenger's side instrument panel module is also secured to the beam. A defrost module is located adjacent at least one of the driver's side module and said passenger side module and positioned to provide forced air flow over a windshield of the vehicle. A driver's side vent module is disposed between the driver's side module and a sidewall of the compartment. A passenger side vent module is disposed between the passenger side module and an opposed compartment sidewall.

According to an alternative embodiment, an instrument panel for an automotive vehicle is provided. This embodiment includes a first module, a second module including at least one display device, and a third module configured to abut the first module to form an at least substantially contiguous surface. The first module includes a first mating surface suited for supporting the second module and a second mating surface suited for supporting the third module.

According to a third embodiment, a modular dashboard is provided. The dashboard includes a driver's side module housing a display device, a passenger side module housing an impact safety device, a defrost module including at least one outlet suitable for releasing air, a driver's side air vent module, and a passenger side air vent module. Each module comprises a separable component configured to mate with at least one other module to form an at least substantially contiguous dashboard surface.

According to a fourth embodiment, a method of constructing a dashboard of an automotive vehicle is disclosed. The method includes providing at least two driver side modules, each of the modules having a different configuration, providing a passenger side module, selecting one of the driver side modules, and attaching the driver side module and said passenger side module to a hanger beam to form an at least substantially contiguous top and front surface of the dashboard.

BRIEF DESCRIPTION OF THE DRAWINGS

The following description and drawings set forth certain illustrative embodiments of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION

Figure 1:
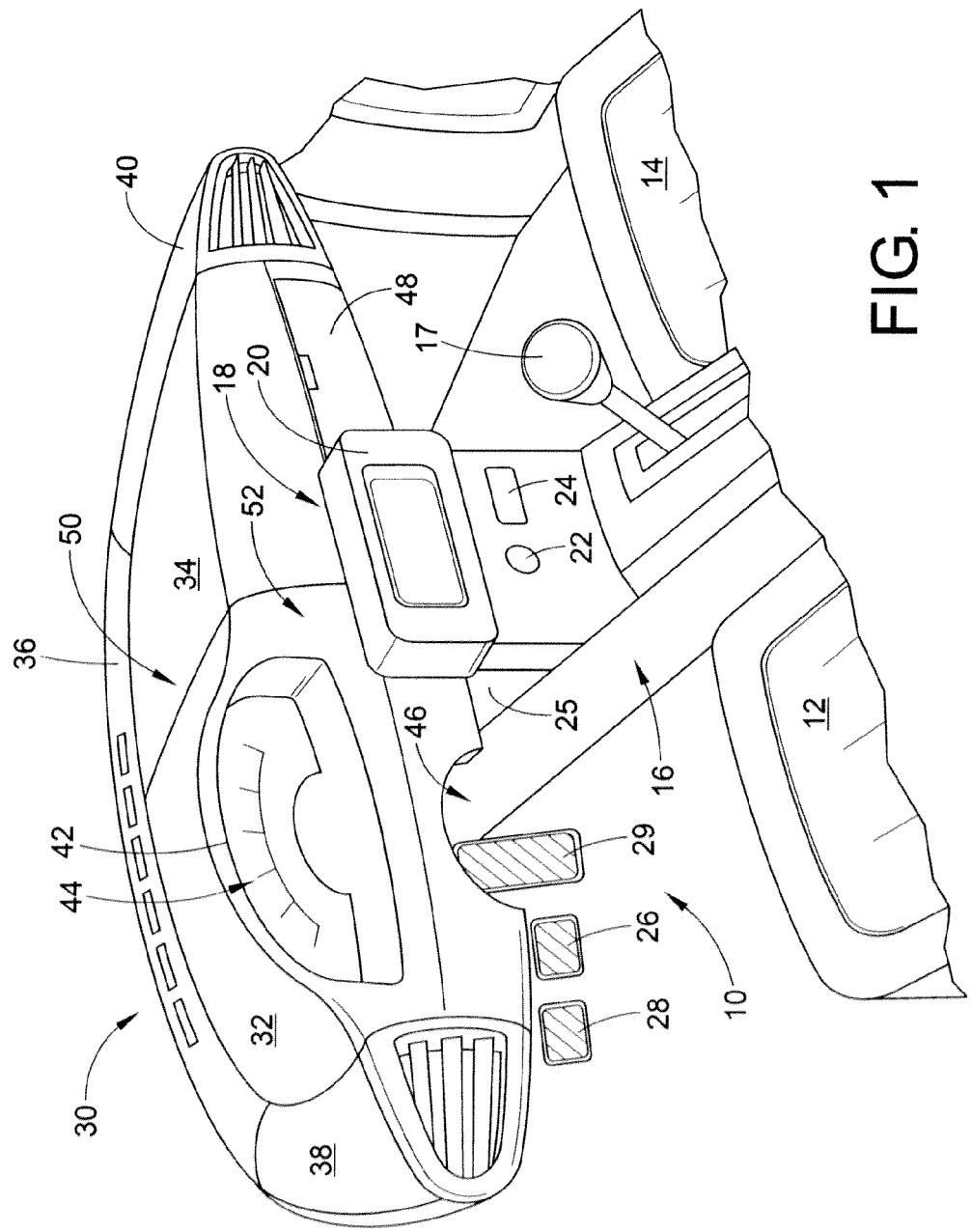
FIG. 1 is a schematic view of an instrument panel assembly within a vehicle.

Referring now to FIG. 1, a vehicle passenger compartment 10 includes traditional components such as a driver seat 12 and a passenger seat 14. A center console 16 is provided intermediate driver seat 12 and passenger seat 14. Center console 16 is equipped with a gear shift lever 17 which could alternatively be disposed on a steering column (not shown).

Center console 14 further includes an instrument control panel 18 including a navigation control 20, audio control 22, and ventilation control 24. It is envisioned that instrument control panel 18 is rotatable between a stowed position within a recess 25 in center console 16 and an extended position as shown. Passenger compartment 10, is further provided with typical vehicle control mechanisms including brake 26, clutch 28 and accelerator 29.

The vehicle dashboard 30 is comprised of multiple modular components. More particularly, driver side module 32, passenger side model 34, defrost module 36, driver side vent module 38 and passenger side vent module 40 are cooperatively assembled to provide a contiguous dashboard. As used herein a contiguous dashboard refers fundamentally to top surface and front surface facing the passengers. Moreover, the bottom surface and the surface facing the vehicle engine compartment are not necessarily contiguous. More particularly, referring to the depicted embodiment, the driver side module 32, passenger side module 34, defrost module 36, driver side vent module 38 and passenger side vent module 40 can be configured to provide a substantially contiguous top surface 50 and front surface 52, generally similar to what would be provided via a singlular molded dashboard body.

Dashboard 30 extends essentially over the entire width of the vehicle passenger compartment 10 below a windshield (not illustrated). Driver side module 32 is provided with a display 42 housing a group of instruments 44 employed in operating the vehicle. These can include a speedometer, a tachometer, fuel gauge, oil pressure gauge, temperature gauge, and warning indicators, as examples. In addition, the driver's side module 32 is shaped to accommodate a steering column through slot 46. Passenger's side module 34 may have a glove compartment 48 and/or contain an anti-impact safety device such as an airbag 49 (shown in phantom in FIGS. 3B and 3C). The dashboard 30 illustrated here is designed for a left-hand-drive vehicle. The dashboard can also be designed in a corresponding manner for a right-hand-drive vehicle.

Dashboard 30 extends essentially over the entire width of the vehicle passenger compartment 10 below a windshield (not illustrated). Driver side module 32 is provided with a display 42 housing a group of instruments 44 employed in operating the vehicle. These can include a speedometer, a tachometer, fuel gauge, oil pressure gauge, temperature gauge, and warning indicators, as examples. In addition, the driver's side module 32 is shaped to accommodate a steering column through slot 46. Passenger's side module 34 may have a glove compartment 48 and/or contain an anti-impact safety device such as an airbag 49 (shown in phantom in FIGS. 3B and 3C). The dashboard 30 illustrated here is designed for a left-hand-drive vehicle. The dashboard can also be designed in a corresponding manner for a right-hand-drive vehicle.

Figure 2:
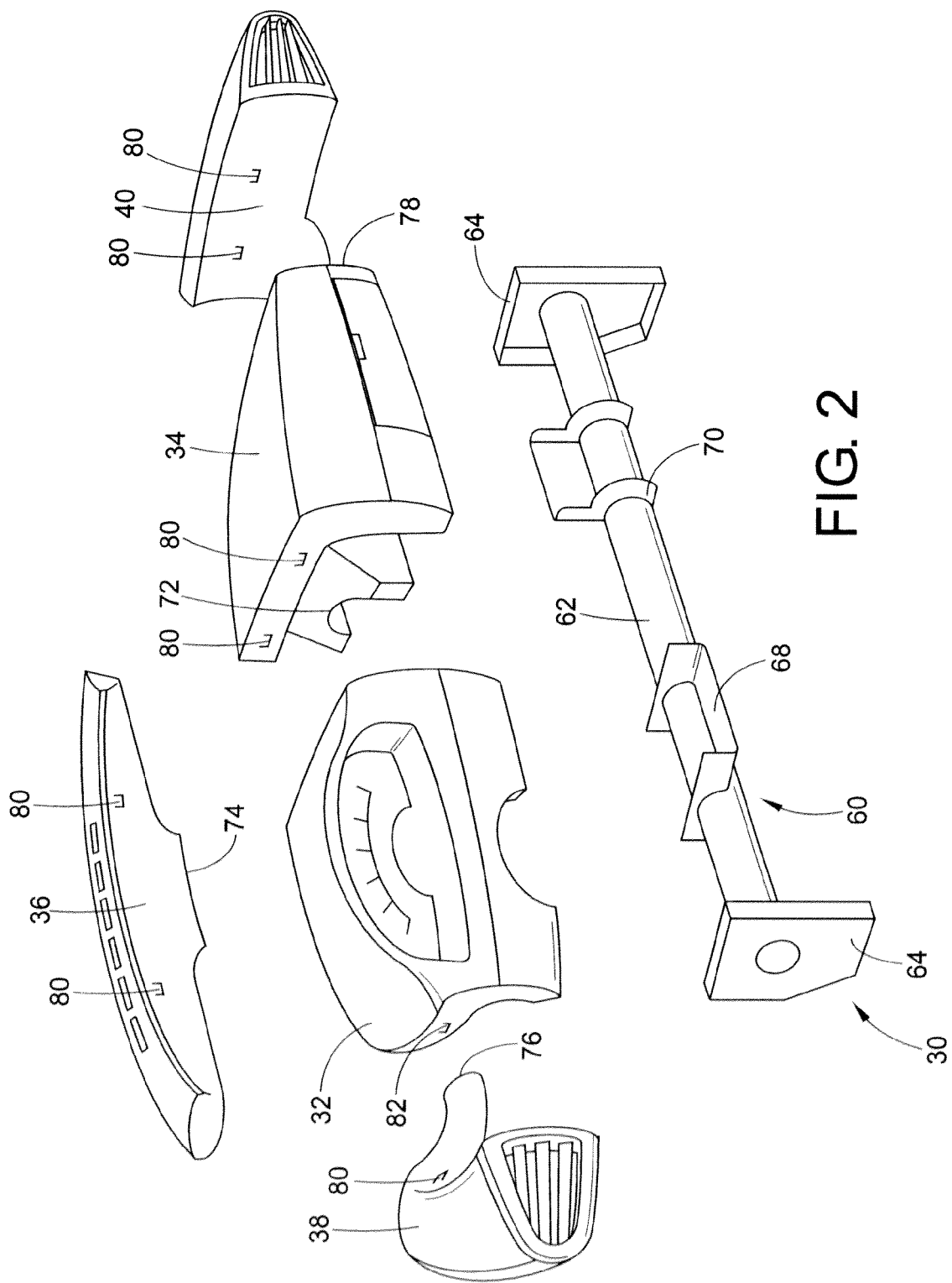
FIG. 2 is an exploded schematic view of the multi-piece modular instrument panel.

Referring now to FIG. 2, the modularity of the dashboard 30 is more particularly displayed. A hanger beam 60 is comprised of an elongated rod member 62, end plates 64, driver side mounting bracket 68 and passenger side mounting bracket 70. The hanger beam 60 can be comprised of metal, a composite composition or a composite composition reinforced with metal, as examples. Hanger bar 60 is secured through end plates 64 to the side walls of the passenger compartment. Attachment of the end plates can be performed by welding, screws, nuts and bolts or other means available to the skilled artisan.

Driver side module 32 is provided with a mounting recess to cooperatively mate with the driver side mounting bracket 68. Passenger side module 34 is also provided with a mounting recess to cooperatively receive passenger side mounting bracket 70. In this manner, driver side module 32 and passenger side module 34 can be suspended in a suitable position upon hanger beam 60. It is noted that each of driver side module 32 and passenger side module 34 can further include a generally cylindrical passage 72 to facilitate a more secure mating with hanger beam 60. In its assembled condition, the hanger beam 60 of the modular dashboard is not visible to a vehicle occupant.

Each of defrost module 36, driver side module 38 and passenger side vent 40 include inlets 74, 76, and 78, respectively, designed to mate in a traditional manner with a forced air supply system in communication with the engine compartment of the vehicle.

In order to fasten the modules to one another, rapid fasteners, such as hooks/clips, can be employed. Hooks/clips allow rapid and simple assembly of the dashboard 30. For example, the modules can be supplied with cooperative hook 80 and clip 82 members to facilitate releasable interlocking between the modules.

Figure 3A:
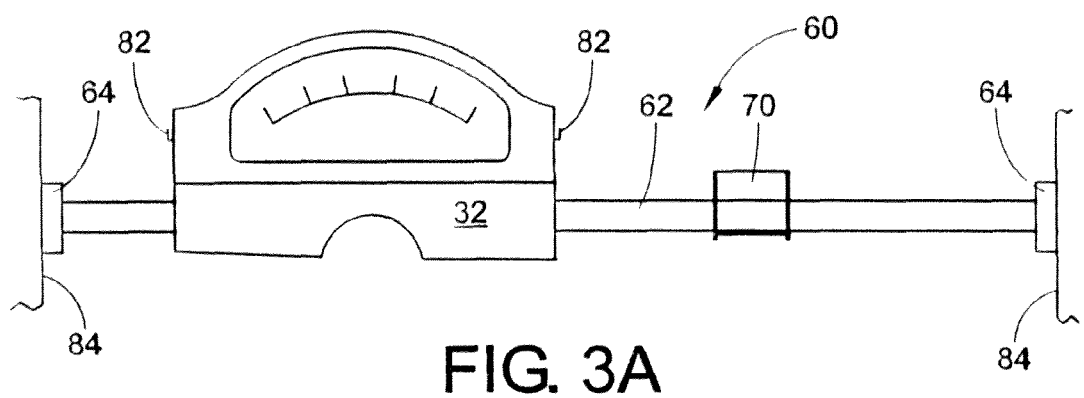
FIG. 3A is a front elevation view of the instrument panel including an installed driver side module.
Figure 3B:
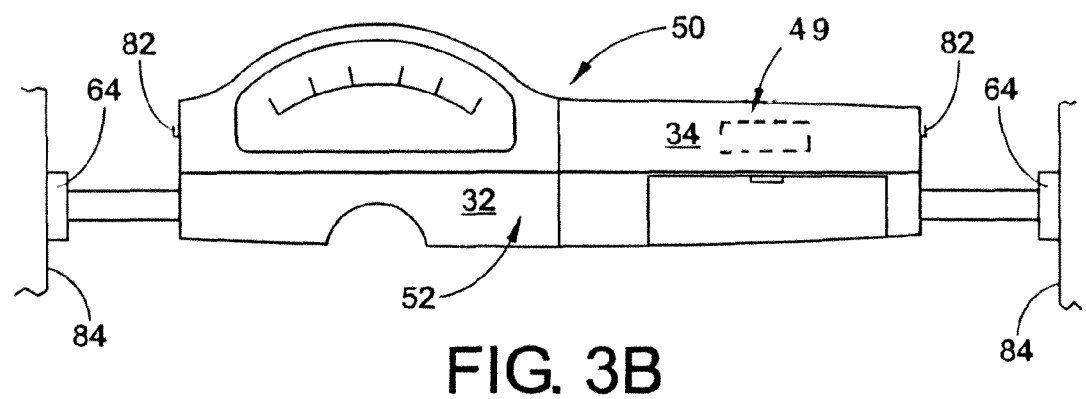
FIG. 3B is a front elevation view of the instrument panel of FIG. 3 including an installed passenger side module.
Figure 3C:
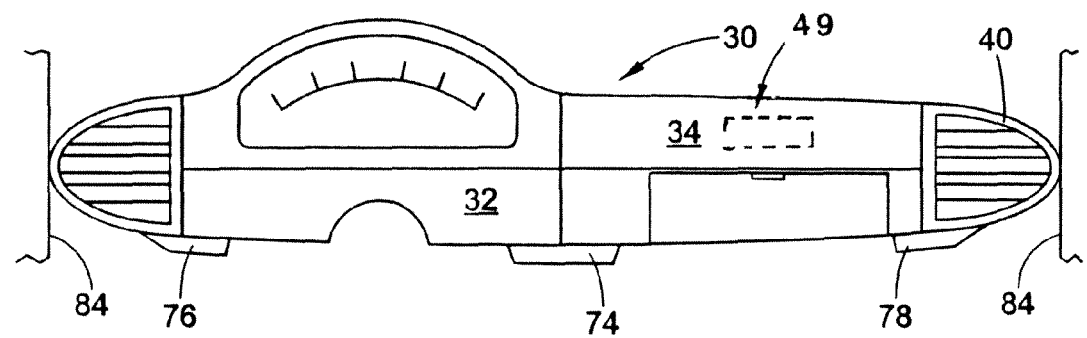
FIG. 3C is a front elevation view of a fully assembled instrument panel.

Referring now to FIGS. 3A through 3C, the assembly of the modular dashboard 30 is depicted. More particularly, hanger beam 60 is shown as secured via end plates 64 to vehicle walls 84. Although it is contemplated that a variety of the modules can be assembled into the dashboard in a various order, FIG. 3A depicts driver side module 32 seated first upon hanger beam 62. Clips 82 are provided to receive hooks associated with additional modules.

Referring now to FIG. 3B, passenger side module 34 has been installed by mating with passenger side bracket 70 and engaging driver side module 32, forming a contiguous upper service 50. Defrost module 36 can be supported via a conformal mating surface between the modules and the sidewall of the vehicle compartment and further by a hook and clip arrangement between driver side module 32 and passenger side module 34. Similarly, driver side vent 38 and passenger side vent 40 can be supported by conformal mating surfaces and by a hook and clip arrangement. In addition, it is contemplated that hanger beam 62 could act as a support member for the defrost or vent modules.

Each of defrost module 36, driver side vent module 38 and passenger side vent module 40 are provided with inlets 74, 76 and 78 respectively, situated to mate with a forced air source which can reside within the engine compartment. In this manner, a heating and ventilation system can be provided directing air as is typical in automotive vehicles.

A standard dashboard module is disclosed above. It is also contemplated that a variety of modules can be alternatively fitted on the dashboard. The configuration of the dashboard and the configuration of the rapid fasteners are expediently selected in such a manner to allow one of the variable modules to be interchanged for one another, without complex and costly installation work being required. In this regard, various driver or passenger side modules could be available having optional equipment such as navigation systems, back-up assist, television display, or electronics docking stations, etc.

In this manner, a customer can tailor his or her vehicle. Similarly, because the modules are easily removed and exchanged, customization can be performed post assembly line, such as at the point of sale. For this reason, the fastening elements are designed in such a manner that they enable the modules to be removed without destruction of the fastening elements and without destruction of the module.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The invention claimed is:

1. An automotive vehicle including a passenger compartment having opposed side walls and housing an instrument panel, said instrument panel comprised of:
    a beam disposed at a forward end of said compartment and extending across a width of said compartment the beam including opposed ends mounted to each of said opposed side walls;
    a driver's side module secured to said beam;
    a passenger's side module secured to said beam;
    a defrost module adjacent at least one of said driver's side module and said passenger side module and positioned to provide forced air flow over a windshield of the vehicle;
    a driver's side vent module disposed between said driver's side module and a sidewall of said compartment; and,
    a passenger side vent module disposed between said passenger side module and an opposing sidewall of said compartment.

2. The vehicle of claim 1 wherein said passenger side module includes an anti-impact safety device.

3. The vehicle of claim 1 wherein said display device is selected from speedometer, odometer, tachometer, fuel gauge, oil pressure gauge, temperature gauge, warning indicators and combinations thereof.

4. The vehicle of claim 1 wherein at least said driver's side and said passenger's side modules are removably attached to said beam.

5. The vehicle of claim 1 further comprising a center console remote from the instrument panel having at least one of audio control, ventilation control and a navigation system.

6. The vehicle of claim 1 wherein said drivers side module and said passenger side module form an at least substantially contiguous exposed top surface.

7. The vehicle of claim 1 wherein said beam comprises an elongated cylindrical body.

8. The vehicle of claim 4 wherein said beam includes a pair of brackets configured to be received in each of said driver's side module and said passenger side module.

9. The vehicle of claim 8 wherein said brackets are dissimilarly configured.

10. The vehicle of claim 1 wherein each of said defrost module, driver side vent module and passenger side vent module include an inlet configured to receive a forced air flow.

* * * * *